(12) United States Patent
Friedman

(10) Patent No.: US 7,284,853 B2
(45) Date of Patent: Oct. 23, 2007

(54) CLIP-ON WITH FLEXIBLE AND EXPANDABLE BRIDGE MEMBER

(76) Inventor: Dean Friedman, 61 Ulster Ave., Atlantic Beach, NY (US) 11509

( * ) Notice: Subject to any disclaimer, the term of this patent is extended or adjusted under 35 U.S.C. 154(b) by 74 days.

(21) Appl. No.: 11/125,513

(22) Filed: May 9, 2005

(65) Prior Publication Data
US 2006/0250570 A1  Nov. 9, 2006

(51) Int. Cl.
G02C 9/00 (2006.01)

(52) U.S. Cl. .................. 351/47; 351/48; 351/57; 351/58; 351/126; 351/128

(58) Field of Classification Search ............. 351/47, 351/48, 57, 58, 44, 41, 158, 124, 126, 128, 351/130, 133
See application file for complete search history.

(56) References Cited

U.S. PATENT DOCUMENTS

| | | | |
|---|---|---|---|
| 2,926,563 A | 3/1960 | Lockwood | |
| 3,575,497 A | 4/1971 | Lockwood | |
| 5,164,749 A | 11/1992 | Shelton | |
| D350,359 S | 9/1994 | Friedman | |
| 5,477,281 A | 12/1995 | Boyer | |
| 5,953,096 A | 9/1999 | Friedman | |
| 6,244,704 B1 | 6/2001 | Xiao | |
| 6,302,538 B1 | 10/2001 | Friedman | |
| 6,371,612 B1 | 4/2002 | Barrows | |
| 6,685,312 B2 | 2/2004 | Friedman | |
| 6,773,105 B2 | 8/2004 | Friedman | |
| 6,869,179 B2 | 3/2005 | Friedman | |
| 7,052,129 B2 * | 5/2006 | Chao et al. | 351/44 |

* cited by examiner

*Primary Examiner*—Hung Xuan Dang
(74) *Attorney, Agent, or Firm*—Robert L. Epstein; Epstein Drangel Bazerman & James, LLP

(57) ABSTRACT

The expandable and flexible bridge member is adapted for use a a part of clip-on sunglasses. It permits the sunglasses to be mounted on any eyeglasses, including those with a protruding bridge, with the bridge member of the sunglasses in alignment with the bridge of the eyeglasses. The bridge member can take the form of a uniquely shaped spring with a shrink wrapped plastic sleeve or one or more strips of elastic or rubber-like material. The bridge member is provided with a bridge engaging capability so that proper alignment is maintained with the eyeglasses bridge. The bridge engaging structure may take the form of a recess or a hook.

31 Claims, 5 Drawing Sheets

CLIP-ON WITH FLEXIBLE AND EXPANDABLE BRIDGE MEMBER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

1. Field of the Invention

The present invention relates to clip-on sunglasses and more particularly to an improved bridge member for clip-on sunglasses that enables the sunglasses to be mounted on eyeglasses in which the bridge of eyeglasses lies at least partially out of the plane of the eyeglass lenses, with the bridge member of the sunglasses in alignment with the protruding bridge of the eyeglasses.

2. Description of Prior Art Including Information Disclosed Under 37 CFR 1.97 and 1.98

Clip-on sunglasses consist of a metal or plastic frame that carries a pair of light attenuating plastic or glass lenses. A mechanism is provided to removably mount the clip-on sunglasses on the frame of eyeglasses.

In order to be commercially acceptable, the clip-on sunglasses must be light in weight, reasonably rugged and relatively inexpensive. They must also be easy to mount onto and remove from eyeglasses. Further, the clip-on sunglasses must mount without damaging the eyeglasses, particularly the lenses.

One common type of mounting mechanism is a clamp that is attached to the bridge of the sunglasses. The clamp typically has pairs of opposing prongs that are spring-loaded toward each other so as to retain the lenses of the eyeglasses therebetween. Examples of this clamping-type mechanism are disclosed in U.S. Pat. No. 3,575,497 issued Apr. 30, 1971 to Leblanc, U.S. Pat. No. 5,164,749 issued Nov. 17, 1982 to Shelton and U.S. Pat. No. Des. 350359 issued Sep. 6, 1994 to Friedman.

However, clamp-type mechanisms have their disadvantages. In order to secure the clip-on sunglasses, the prongs must clamp tightly to the lenses, potentially scratching the lenses. The mechanism may partially obstruct the view of the user. Moreover, clamp-type mechanisms have several inter-engaging parts which must be fabricated precisely and assembled, making the mechanism relatively expensive and sometimes unreliable.

In order to overcome the drawbacks of the clamp-type mechanisms, a different mechanism was developed for mounting clip-on sunglasses that does not contact or clamp the lenses of the eyeglasses and therefore cannot scratch them. Instead of a clamp, it utilizes one or more sets of exposed spring-loaded prongs. The prongs are movably or flexibly mounted such that they can be moved against a spring force, for insertion between spaced portions of the eyeglasses frame. The spring force causes the prongs to frictionally engage the eyeglasses frame. Because the prongs only engage the frame, the lenses of the eyeglasses cannot be scratched. An example of such a mechanism is disclosed in U.S. Pat. No. 5,953,096 entitled "Universal enter Bridge Mounting Mechanism for Clip-On Sunglasses" issued to Friedman on Sept. 14, 1999.

Another type of clip-on sunglasses, such as is disclosed in Lockwood U.S. Pat. No. 2,926,563, consists of mirror image frame sections, each of which includes of a lens and a bridge element. The bridge elements are connected together by a bridge mechanism that includes an exposed metal coil spring. Each frame section, at its outer extremity, is provided with a set (typically two or three) of spaced eyeglass frame engaging prongs protruding rearwardly from the plane of the lens sections. The spring bridge mechanism permits the frame sections to be moved away from each other, against the force of the spring. When the frame sections are moved away from each other, the eyeglasses frame can be inserted between the prong sets. Releasing the frame sections permits the spring to move frame sections back toward each other, such that the eyeglass frame is securely retained between the prongs sets.

One problem inherent in the Lockwood type spring bridge mechanism is that the coil spring is exposed. Aside from being unsightly, this is undesirable because bits of solid debris and other particulate foreign matter can lodge between the coils and jam the mechanism or distort the spring. Liquid, such as rain or sweat, can enter the mechanism resulting in rusting or deterioration of the parts. Further, the skin, hair and eyebrows of the user are not protected from being pinched by the exposed spring.

I therefore developed an improved spring bridge mechanism that overcomes the exposed spring problem by enclosing the coil spring within a slender metal tubular enclosure. The enclosure isolates the spring from the skin and hair of the wearer and prevents debris and liquids from reaching the spring.

The enclosure serves the additional purpose of keeping the frame sections in the proper plane as they are moved. This is achieved by forming an axially extending slot in the enclosure which cooperates with a protrusion to maintain the frame sections in the same plane.

The enclosure also enhances the appearance of the clip-on sunglasses by hiding the unslightly spring. Preferably, the enclosure is made of the same material and finish as the bridge elements and frame, resulting in a mechanism which is much more aesthetically pleasing than an exposed spring.

I received U.S. Pat. No. 6,234,528 issued May 22, 2001, U.S. Pat. No. 6,302,538 issued Oct. 16, 2001, U.S. Pat. No. 6,685,314 issued Feb. 3, 2004, U.S. Pat. No. 6,773,105 issued Aug. 10, 2004 and U.S. Pat. No. 6,869,179 issued Mar. 22, 2005 for various embodiments of my enclosed spring bridge mechanism invention.

With the exception of the enclosed spring bridge mechanisms disclosed in U.S. Pat. No. 6,685,314 and U.S. Pat. No. 6,869,179, enclosed spring mechanisms are generally not designed to align with the bridge of the eyeglasses upon which the clip-on sunglasses are mounted. Accordingly, it makes no difference if the bridge of the eyeglasses extends beyond the plane of the lenses of the eyeglasses because it will not interfere with the bridge mechanism of the clip-on sunglasses.

However, in a configurations such as shown in U.S. Pat. No. 6,685,314 or in U.S. Pat. No. 6,869,179, where the bridge mechanism of the clip-on sunglasses is designed to align with the bridge of the eyeglasses upon which the sunglasses are mounted, an eyeglass bridge that protrudes out of the plane of the eyeglass lenses will interfere with the bridge mechanism of the clip-on sunglasses and prevent the clip-on from being properly mounted on the eyeglasses. This is because the bridge mechanism of the clip-on sunglasses cannot bend or flex to accommodate the protruding bridge of the eyeglasses. Since many, if not most, eyeglasses have bridges that at least partially extend out of the plane of the lenses, and none of the known enclosed spring bridge mechanisms is bendable or flexible, none can be used in situations in which the enclosed spring bridge mechanism must align with the protruding bridge of the eyeglasses.

It is, therefore, a primary object of the present invention to provide clip-on sunglasses capable of being mounted on eyeglasses having a bridge that at least partially extends outside of the plane of the lenses, with the bridge member of the clip-on sunglasses in alignment with the bridge of the eyeglasses.

It is another object of the present invention to provide clip-on sunglasses with a flexible and expandable bridge member.

It is another object of the present invention to provide clip-on sunglasses having a flexible and expandable bridge member capable of engaging the bridge of the eyeglasses so as to maintain alignment therebetween.

In another embodiment, the connecting member is made of elastic material. It may have an arcuate or rectangular cross-sectional configuration. Alternatively, the member may be bifurcated to define a bridge receiving recess.

Means are provided for attaching the ends of the connecting member to the first and second lens sections, respectively. Each attaching means includes an element fixed to the lens section. The element defines a recess into which the end of the member is received. Means are provided for retaining the end of the member within the element recess.

The connecting member urges the lens sections toward the proximate position.

The lenses of the eyeglasses are situated substantially in a plane. At least a portion of the bridge of the eyeglasses is situated outside the plane of the eyeglass lenses.

BRIEF DESCRIPTION OF THE SEVERAL VIEWS OF DRAWINGS

To these and to such other objects that may hereinafter appears, the present invention relates to clip-on sunglasses with a flexible and expandable bridge member as described in detail in the following specification and recited in the annexed claims, taken together with the accompanying drawings, in which like numerals refer to like parts and in which:

DETAILED DESCRIPTION OF THE INVENTION

Figure 1:
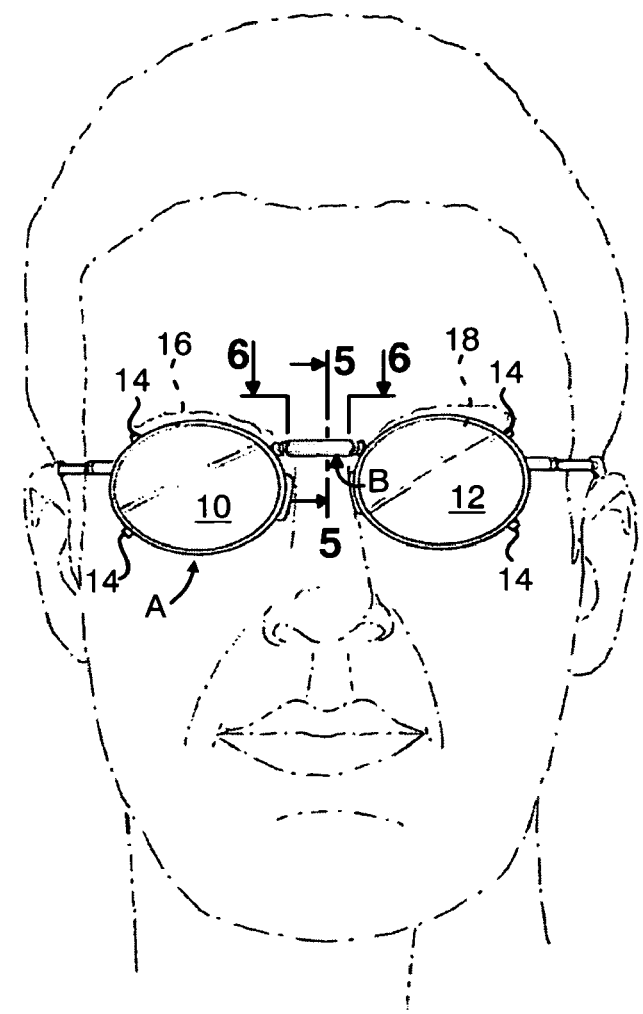
FIG. 1 is a front view of a person wearing eyeglasses with the clip-on sunglasses of the present invention mounted thereon.
Figure 2:
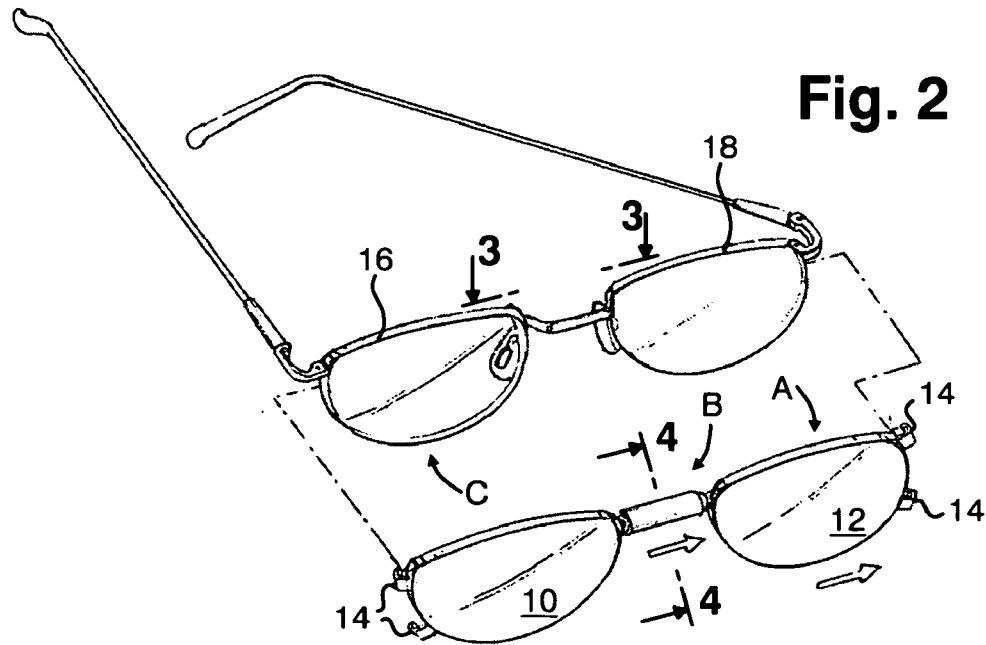
FIG. 2 is an exploded isometric view of the eyeglasses and clip-on sunglasses of FIG. 1.

As seen in FIGS. 1 and 2, the present invention relates to clip-on sunglasses, generally designated A, consisting of lens sections 10 and 12 connected together by a bridge member, generally designated B. Bridge member B is expandable to permit the lens sections 10, 12 to be moved between a proximate position, as shown in FIG. 1, and a remote position, as shown in FIG. 2, in the direction of the arrows of FIG. 2. Bridge member B urges the lens sections 10, 12 toward the proximate position.

Each of the lens sections 10, 12 has a pair of spaced, eyeglass engaging prongs 14 situated along the outer portion of the rim. Prongs 14 are preferably generally "L" shaped and extend rearwardly from sunglasses A. Prongs 14 are adapted to engage the rims of the lens sections 16, 18 of eyeglasses, generally designated C, when the lens sections 10, 12 of sunglasses A are moved apart, from the proximate position to the remote position, to expand bridge member B. Sunglasses B are then situated adjacent to the front of eyeglasses C, and lens sections 10, 12 of sunglasses A are released, such that the expanded bridge member B can move the lens sections 10, 12 of sunglasses A back to their normal, proximate position.

Aside from being expandable, bridge member B is also flexible. This flexibility permits the bridge member B it align with the bridge 20 of eyeglasses C, even when bridge 20 protrudes from the plane of lens sections 16, 18.

Figure 3:
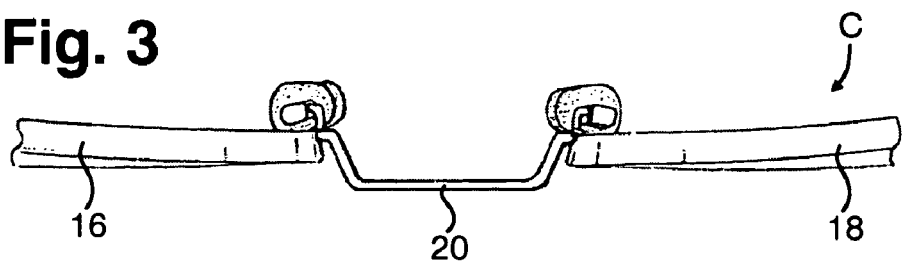
FIG. 3 is a top elevation view of the eyeglasses taken along line 3-3 of FIG. 2, showing the protruding bridge.
Figure 6:
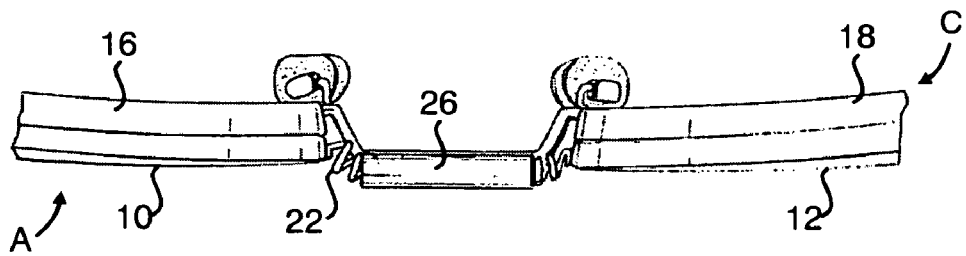
FIG. 6 is a top elevation view taken along line 6-6 of FIG. 1 showing the eyeglasses with the clip-on sunglasses mounted thereon and illustrating one version of the first preferred embodiment of the bridge member.

This may be appreciated with reference to FIGS. 3 and 6. FIG. 3 shows a top view of eyeglasses C. Lens sections 16 and 18 are connected by bridge 20 which is rigid. Bridge 20 has a central portion that protrudes forwardly of the plane of the lens sections 16, 18.

As is illustrated in FIG. 1, it is desirable for aesthetic reasons for bridge member B of sunglasses A to be aligned with bridge 20 of eyeglasses C when the sunglasses are mounted on the eyeglasses. That being the case, if bridge member B were not flexible, the protruding portion of bridge 20 would interfere with the bridge member of the sunglasses. Because the bridge member is flexible as well as expandable, it is able to conform to the shape of the bridge of the eyeglasses, as seen in FIG. 6. The flexibility and expandability of the bridge member permits it to accommodate eyeglasses with bridges of shapes, such as arcuate.

As side from being expandable to permit mounting of the sunglasses and flexible to accommodate protruding bridges of various shapes, it is desirable for bridge member B to be capable of engaging bridge 20 of the eyeglasses so as to maintain the bridge member of the sunglasses in alignment with the bridge of the eyeglasses. As explained in detail below, the bridge engaging function can be achieved in a variety of different ways.

The first preferred embodiment of the bridge member B of the present invention takes the form of a uniquely shaped helical spring 22 with a substantially "V" shaped recess 24 formed by aligned indentations in the coils such that it has the shape illustrated It is another object of the present invention to provide clip-on sunglasses with a bridge member in the form of a sleeve enclosed spring with an eyeglasses bridge receiving recess or engaging hook element.

It is another object of the present invention to provide clip-on sunglasses with a bridge member formed of elastic material and having a bridge receiving recess.

BRIEF SUMMARY OF THE INVENTION

In accordance with the present invention, sunglasses are provided that are adapted to be mounted on eyeglasses of the type having lenses connected by a bridge. The sunglasses include first and second lens sections. Each of the lens sections includes eyeglasses engaging means. Means are provided for connecting the first and second lens sections for movement between a proximate position and a remote position to mount the sunglasses on the eyeglasses. The connecting means includes a flexible and expandable bridge member.

Preferably, the bridge member has means for maintaining alignment with the bridge of the eyeglasses, when the sunglasses are mounted thereon.

Figure 4:
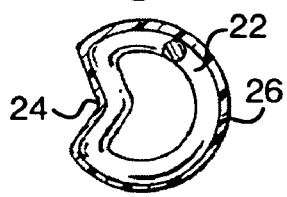
FIG. 4 is a cross-sectional view taken along line 4-4 of FIG. 2.
Figure 5:
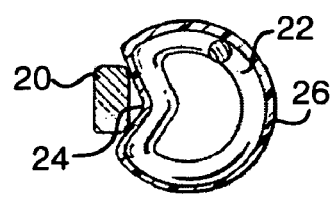
FIG. 5 is a view similar to FIG. 4 and additionally showing the bridge member of the sunglasses aligned with the bridge of the eyeglasses.
Figure 7:
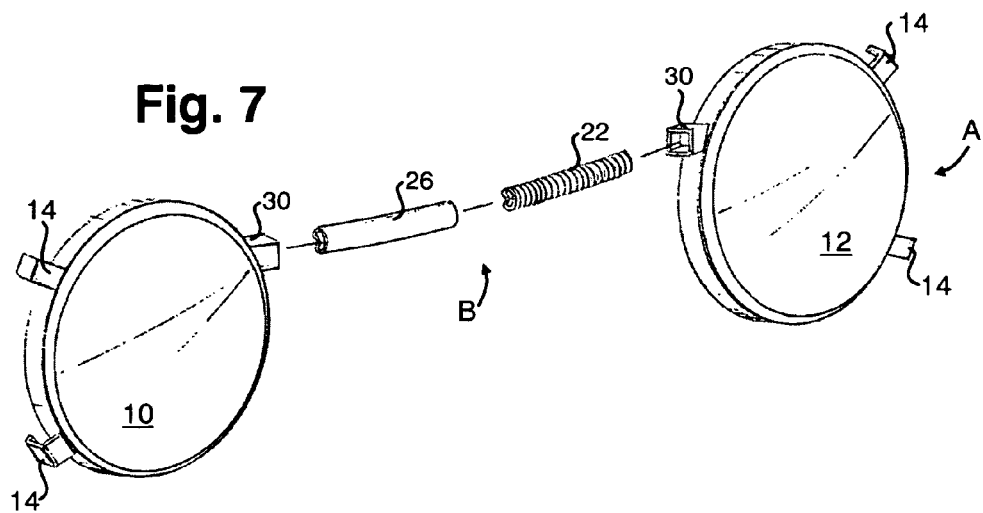
FIG. 7 is an exploded isometric view of the sunglasses of FIG. 6.

In one preferred embodiment, the member includes a spring. The spring has a substantially "V" shaped recess, when the spring is viewed in cross-section. A sleeve is provided surrounding the spring. The sleeve substantially conforms to the contour of the spring. Preferably, means are provided for limiting the expansion of the spring. Alternatively, the spring may have one or more bridge engaging hook elements. in FIG. 4, when viewed in cross-section. As seen in FIGS. 4, 5 and 7, spring 22 is surrounded by a smooth, flexible sleeve 26, preferably formed of transparent or translucent plastic material. Sleeve 26 is preferably applied to the spring by forming a tube of the plastic material and heat shrinking the tube around the spring such that it conforms closely to the contour of the spring and particularly to the contour of recess 24 therein. FIG. 5 illustrates how bridge 20 of the eyeglasses is received in recess 24 of bridge member B to maintain the alignment therebetween.

Figure 8:
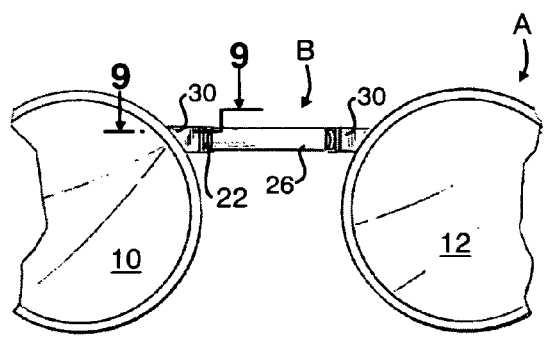
FIG. 8 is a partial front elevation view of the sunglasses of FIG. 7.
Figure 9:
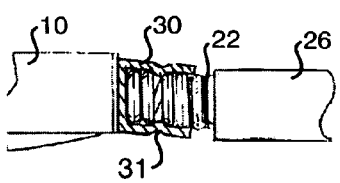
FIG. 9 is an enlarged cross-sectional view taken along line 9-9 of FIG. 8.

Another aspect of the present invention relates to the manner in which the ends of the spring 22 are affixed to the rims of the lens sections 10, 12 of the sunglasses. Referring to FIGS. 7, 8 and 9, it can be seen that a hollow, open ended, box-like connecting part 30 is fixed to each lens section rim, such as by welding or adhesive. The opposite ends of spring 22 are received in the recesses formed by the two parts 30 fixed to lens sections 10, 12, respectively. The sides of the parts 30 are then crimped at 31 about the received spring end to permanently attach the bridge member B between the lens sections.

Figure 10:
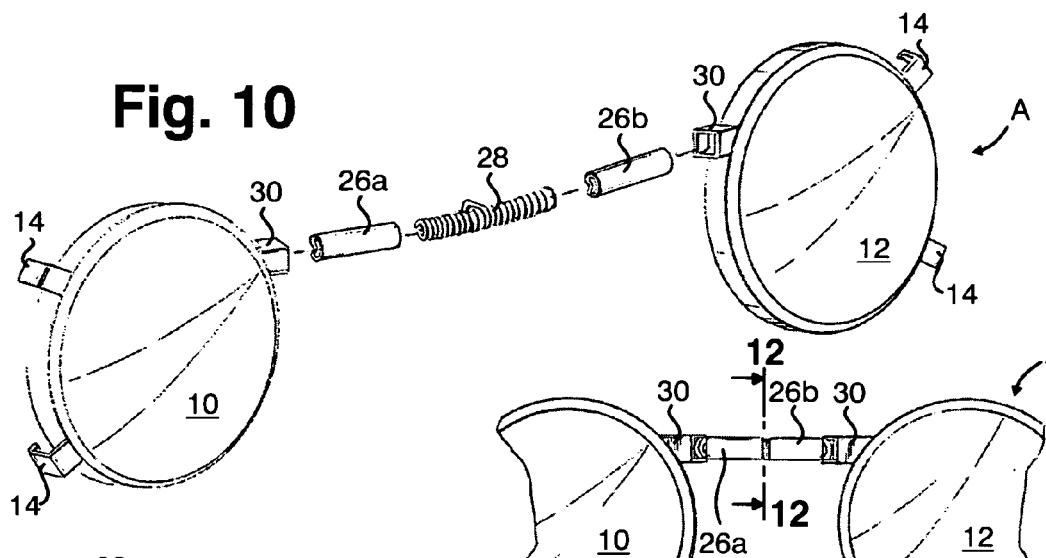
FIG. 10 is an exploded isometric view of a second version of the first preferred embodiment of the sunglasses of the present invention.
Figure 11:
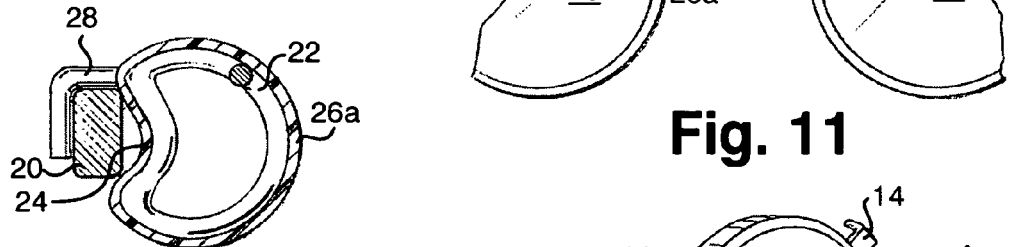
FIG. 11 is a partial front elevation view of the sunglasses of FIG. 10
Figure 12:
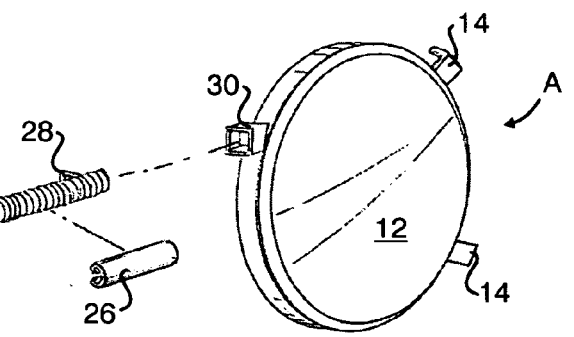
FIG. 12 is a cross-sectional view taken along line 12-12 of FIG. 11.
Figure 13:
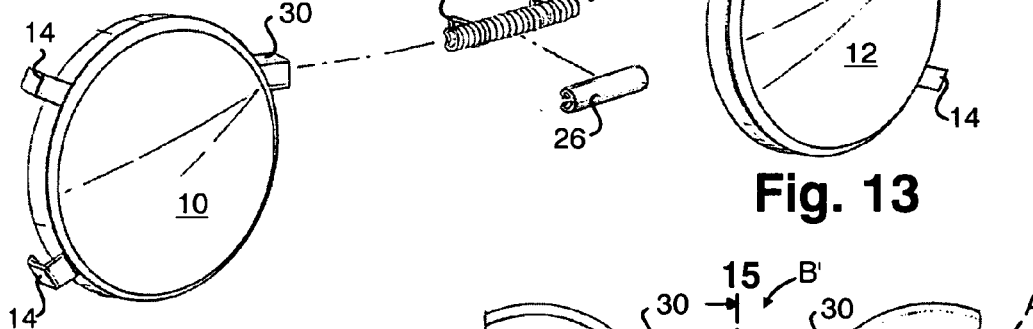
FIG. 13 is an exploded isometric view of a third version of the first preferred embodiment of the sunglasses of the present invention.

Either instead of recess 24, or in addition to the recess, bridge member B can be provided with one or more outwardly extending hooks 28, as illustrated in FIGS. 10 through 13. Hooks 28 is adapted to engage bridge 20 of the eyeglasses, as illustrated in FIG. 12, when sunglasses A are mounted on eyeglasses C.

As illustrated in FIGS. 10 and 11, when a single hook 28 is used, it is preferred to mount the hook proximate to midpoint of the spring and then heat shrink separate sleeve sections 26a and 26b on either side of the hook. When two spaced hooks are the sleeve is situated between the hooks.

Figure 14:
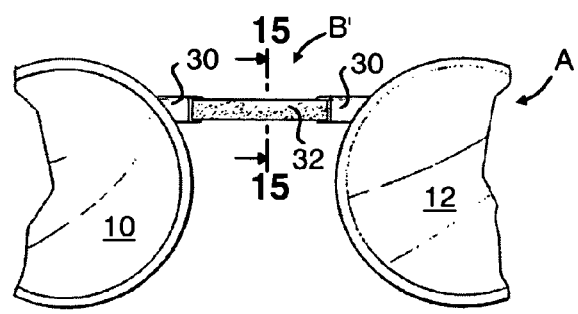
FIG. 14 is a partial front elevation view of one version of a second preferred embodiment of the sunglasses of the present invention.
Figure 15:
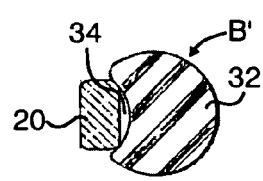
FIG. 15 is a cross-sectional view taken along line 15-15 of FIG. 14.

In the second preferred embodiment of the invention, the spring/sleeve bridge member B is replaced by an elastic bridge member B' formed of rubber or rubber-like expandable and flexible material, similar to a section of a rubber band. As seen in FIGS. 14 and 15, in one version, the rubber material can be formed into a strip 32 having a substantially circular cross-section configuration with a recess 34 adapted to receive at least a portion of bridge 20, in a manner similar to recess 24 in the first preferred embodiment.

Figure 16:
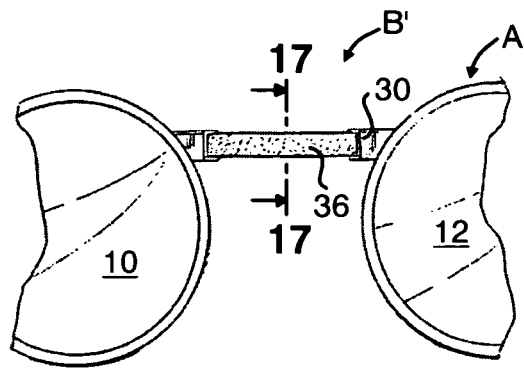
FIG. 16 is a partial front elevation view of a second version of the second preferred embodiment of the sunglasses of the present invention.
Figure 17:
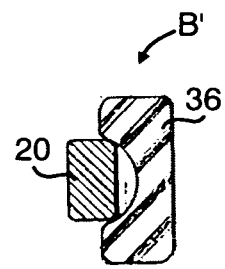
FIG. 17 is a cross-sectional view taken along line 17-17 of FIG. 16.

A second version of the bridge member B' of the present invention is illustrated in FIGS. 16 and 17. That version utilizes an expandable and flexible strip 36, similar to strip 32 but with a more rectangular cross-sectional configuration. Strip 36 has a recess 38, as seen in FIG. 17.

Figure 18:
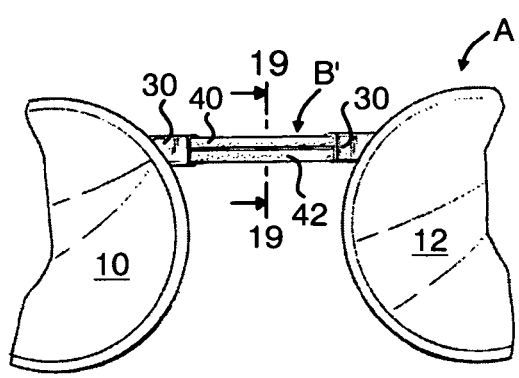
FIG. 18 is a partial front elevation view of a third version of the second preferred embodiment of the sunglasses of the present invention.
Figure 19:
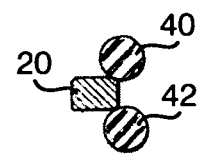
FIG. 19 is a cross-sectional view taken along line 19-19 of FIG. 18.

A third version of the bridge member B' of the present invention is illustrated in FIGS. 18 and 19. In that version the strip of the bridge member is bifurcated. Two side-by-side strips 40, 42 of the rubber material are utilized, instead of the single strip. Preferably each strip 40, 42 is substantially circular is cross-section, naturally defining a recess between them adapted to accept the eyeglass bridge 20, as seen in FIG. 19.

Figure 20:
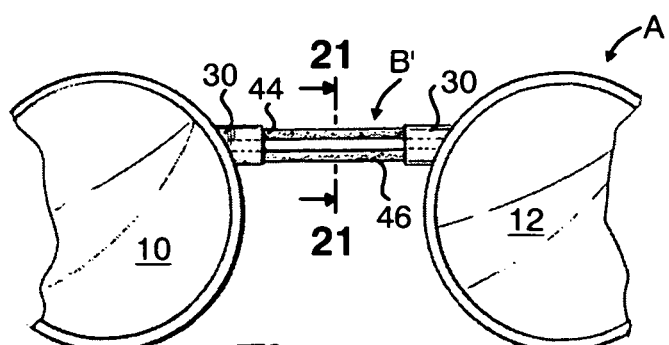
FIG. 20 is a partial front elevation view of a fourth version of the second preferred embodiment of the sunglasses of the present invention.
Figure 21:
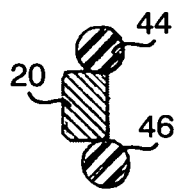
FIG. 21 is a cross-sectional view taken along line 20-20 of FIG. 20.

A fourth version of the bridge member B' of the present invention is illustrated in FIGS. 20 and 21. In that version, two side-by-side strips 44, 46 of the rubber material are provided. However, in this version, strips 44, 46 are spaced from each other a short distance to create a larger recess between them that is adapted to accept the eyeglass bridge 20, as seen in FIG. 21. flexible bridge member for clip-on sunglasses that permits the sunglasses to be mounted on eyeglasses with a protruding bridge, with the bridge member of the sunglasses in alignment with the bridge of the eyeglasses. The bridge member can take the form of a uniquely shaped spring with a shrink wrapped plastic sleeve or one or more strips of rubber or rubber-like material. The bridge member is provided with a bridge engaging means to maintain proper alignment with the eyeglasses bridge. The bridge engaging means may take the form of a recess or a hook.

While only a limited number of preferred embodiments of the present invention have been disclosed for purposes of illustration, it is obvious that many modifications and variations could be made thereto. It is intended to cover all of those modifications and variations which fall within the scope of the present invention, as defined by the following claims.

I claim:

1. Clip-on sunglasses adapted to be mounted on eyeglasses having lenses connected by a bridge, said sunglasses comprising first and second lens sections, each of said lens sections comprising eyeglasses engaging means, and means for connecting said first and second lens sections for movement between a proximate position and a remote position to mount the sunglasses on the eyeglasses, said connecting means comprising at least one continuous flexible and expandable bridge member comprising a first end connected to said first lens section and a second end connected to said second lens section.

2. The sunglasses of claim 1 wherein said expandable bridge member comprises means for maintaining alignment with the bridge of the eyeglasses.

3. The sunglasses of claim 2 wherein said alignment maintaining means comprises means adapted to at least partially receive the bridge of the eyeglasses.

4. The sunglass of claim 2 wherein said alignment maintaining means comprises hook means.

5. The sunglasses of claim 2 wherein said alignment maintaining means comprises a bridge receiving recess in said member.

6. The sunglasses of claim 1 wherein said expandable bridge member comprises a spring.

7. The sunglasses of claim 6 wherein said spring comprises a substantially "V" shaped recess, when said spring is viewed in cross-section.

8. The sunglasses of claim 7 wherein said expandable bridge member further comprises a sleeve substantially surrounding said spring.

9. The sunglasses of claim 8 wherein said sleeve conforms to the contour of said spring.

10. The sunglasses of claim 6 wherein said expandable bridge member further comprises a sleeve substantially surrounding said spring.

11. The sunglasses of claim 10 wherein said sleeve conforms to the contour of said spring.

12. The sunglasses of claim 1 wherein said expandable bridge member comprises an elastic material.

13. The sunglasses of claim 12 wherein said elastic member has an arcuate cross-sectional configuration.

14. The sunglasses of claim 1 wherein said expandable bridge member has a bifurcated section defining a bridge receiving recess.

15. The sunglasses of claim 14 wherein said bifurcated section comprises spaced elastic strips.

16. The sunglasses of claim 1 wherein said expandable bridge member has an end and further comprising means for attaching said member end to one of said lens sections.

17. The sunglasses of claim 16 wherein said attaching means comprises an element fixed to one lens section and defining a recess into which said member end is adapted to be received.

18. The sunglasses of claim 17 further comprising means for retaining said expandable bridge member end within said element recess.

19. The sunglasses of claim 1 wherein said expandable bridge member normally urges said lens sections toward said proximate position.

20. The sunglasses of claim 1 wherein the lenses of the eyeglasses are situated substantially in a plane and wherein at least a portion of the bridge of the eyeglasses is situated outside the plane of the lenses.

21. In combination, the sunglasses of claim 1 and eyeglasses comprising lenses connected by a bridge.

22. The combination of claim 21 wherein said lenses of the eyeglasses are situated substantially in a plane and wherein at least a portion of said bridge of the eyeglasses is situated outside said plane of the lenses.

23. Clip-on sunglasses adapted to be mounted on eyeglasses having lenses connected by a bridge, said sunglasses comprising first and second lens sections, each of said lens sections comprising eyeglasses engaging means, and means for connecting said first and second lens sections for movement between a proximate position and a remote position to mount the sunglasses on the eyeglasses, said connecting means comprising a flexible and expandable bridge member, wherein said expandable bridge member comprises means for maintaining alignment with the bridge of the eyeglasses and said alignment maintaining means comprises means adapted to at least partially receive the bridge of the eyeglasses.

24. Clip-on sunglasses adapted to be mounted on eyeglasses having lenses connected by a bridge, said sunglasses comprising first and second lens sections, each of said lens sections comprising eyeglasses engaging means, and means for connecting said first and second lens sections for movement between a proximate position and a remote position to mount the sunglasses on the eyeglasses, said connecting means comprising a flexible and expandable bridge member, wherein said expandable bridge member comprises means for maintaining alignment with the bridge of the eyeglasses and said alignment maintaining means comprises a bridge receiving recess in said expandable bridge member.

25. Clip-on sunglasses adapted to be mounted on eyeglasses having lenses connected by a bridge, said sunglasses comprising first and second lens sections, each of said lens sections comprising eyeglasses engaging means, and means for connecting said first and second lens sections for movement between a proximate position and a remote position to mount the sunglasses on the eyeglasses, said connecting means comprising a flexible and expandable bridge member, wherein said expandable bridge member comprises a spring and said spring comprises a substantially "V" shaped recess, when said spring is viewed in cross-section.

26. Clip-on sunglasses adapted to be mounted on eyeglasses having lenses connected by a bridge, said sunglasses comprising first and second lens sections, each of said lens sections comprising eyeglasses engaging means, and means for connecting said first and second lens sections for movement between a proximate position and a remote position to mount the sunglasses on the eyeglasses, said connecting means comprising a flexible and expandable bridge member, wherein said expandable bridge member comprises a spring, said spring comprises a substantially "V" shaped recess, when said spring is viewed in cross-section and said expandable bridge member further comprises a sleeve substantially surrounding said spring.

27. Clip-on sunglasses adapted to be mounted on eyeglasses having lenses connected by a bridge, said sunglasses comprising first and second lens sections, each of said lens sections comprising eyeglasses engaging means, and means for connecting said first and second lens sections for movement between a proximate position and a remote position to mount the sunglasses on the eyeglasses, said connecting means comprising a flexible and expandable bridge member, wherein said expandable bridge member comprises a spring, said spring comprises a substantially "V" shaped recess, when said spring is viewed in cross-section and said expandable bridge member further comprises a sleeve substantially surrounding said spring, wherein said sleeve conforms to the contour of said spring.

28. Clip-on sunglasses adapted to be mounted on eyeglasses having lenses connected by a bridge, said sunglasses comprising first and second lens sections, each of said lens sections comprising eyeglasses engaging means, and means for connecting said first and second lens sections for movement between a proximate position and a remote position to mount the sunglasses on the eyeglasses, said connecting means comprising a flexible and expandable bridge member, wherein said expandable bridge member has a bifurcated section defining a bridge receiving recess.

29. Clip-on sunglasses adapted to be mounted on eyeglasses having lenses connected by a bridge, said sunglasses comprising first and second lens sections, each of said lens sections comprising eyeglasses engaging means, and means for connecting said first and second lens sections for movement between a proximate position and a remote position to mount the sunglasses on the eyeglasses, said connecting means comprising a flexible and expandable bridge member, wherein said expandable bridge member has a bifurcated section defining a bridge receiving recess and said bifurcated section comprises spaced elastic strips.

30. Clip-on sunglasses adapted to be mounted on eyeglasses having lenses connected by a bridge, said sunglasses comprising first and second lens sections, each of said lens sections comprising eyeglasses engaging means, and means for connecting said first and second lens sections for movement between a proximate position and a remote position to mount the sunglasses on the eyeglasses, said connecting means comprising first and second spaced flexible and expandable bridge members.

31. Clip-on sunglasses adapted to be mounted on eyeglasses having lenses connected by a bridge, said sunglasses comprising first and second lens sections, each of said lens sections comprising eyeglasses engaging means, and means for connecting said first and second lens sections for movement between a proximate position and a remote position to mount the sunglasses on the eyeglasses, said connecting means comprising a spring having a recess adapted to at least partially receive the bridge of the eyeglasses therein.

* * * * *